United States Patent [19]

Kamiguchi et al.

[11] Patent Number: 4,842,801
[45] Date of Patent: Jun. 27, 1989

[54] METHOD OF CONTROLLING SWITCHING FROM PRESSURE HOLDING TO METERING AND KNEADING

[75] Inventors: Masao Kamiguchi, Houya; Hiroshi Umemoto, Hino, both of Japan

[73] Assignee: Fanuc Ltd, Minamitsuru, Japan

[21] Appl. No.: 175,000

[22] PCT Filed: Jul. 24, 1987

[86] PCT No.: PCT/JP87/00541

§ 371 Date: Feb. 10, 1988

§ 102(e) Date: Feb. 10, 1988

[87] PCT Pub. No.: WO88/00518

PCT Pub. Date: Jan. 28, 1988

[30] Foreign Application Priority Data

Jul. 24, 1986 [JP] Japan ................... 61-172823

[51] Int. Cl.$^4$ ............................................. B29C 45/76
[52] U.S. Cl. ...................... 264/40.1; 318/632; 364/476; 425/135; 425/149; 425/166; 264/40.5
[58] Field of Search .............. 264/40.1, 40.5, 40.7, 264/328.1; 425/135, 136, 145, 149, 150, 155, 162, 166, 169, 214; 318/567, 572, 632; 364/476

[56] References Cited

U.S. PATENT DOCUMENTS 4,524,313  6/1985  Kuno et al. ................. 318/563
4,710,119 12/1987  Otake ........................ 425/150
4,718,841  1/1988  Kiya ......................... 425/171
4,734,025  3/1988  Kawamura et al. ............. 425/171
4,755,123  7/1988  Otake ........................ 264/40.7
4,759,705  7/1988  Otake et al. ................. 425/145

FOREIGN PATENT DOCUMENTS 60-262616 12/1985 Japan .
61-248719 11/1986 Japan .

Primary Examiner—Jan H. Silbaugh
Assistant Examiner—Jill L. Heitbrink
Attorney, Agent, or Firm—Staas & Halsey

[57] ABSTRACT

A switching control method which can smoothly effect transfer from a pressure holding step to a metering and kneading step in an injection-molding machine employing a servomotor as an injection shaft driving source for axially driving a screw. At completion of the pressure holding step, follow-up of an error register of a servo circuit driving the injection shaft servomotor is effected so as to bring an error amount accumulated within the error register to zero (steps S6 to S8). A value of torque limit acting on the servomotor is then switched from a set value for pressure holding to a set value for metering and kneading (step S11). Further, the follow-up of the error register is again executed over a predetermined period of time from the time of execution of the switching of the torque limit (step S13). Subsequently, transfer is effected to the metering and kneading step (step S14).

2 Claims, 3 Drawing Sheets

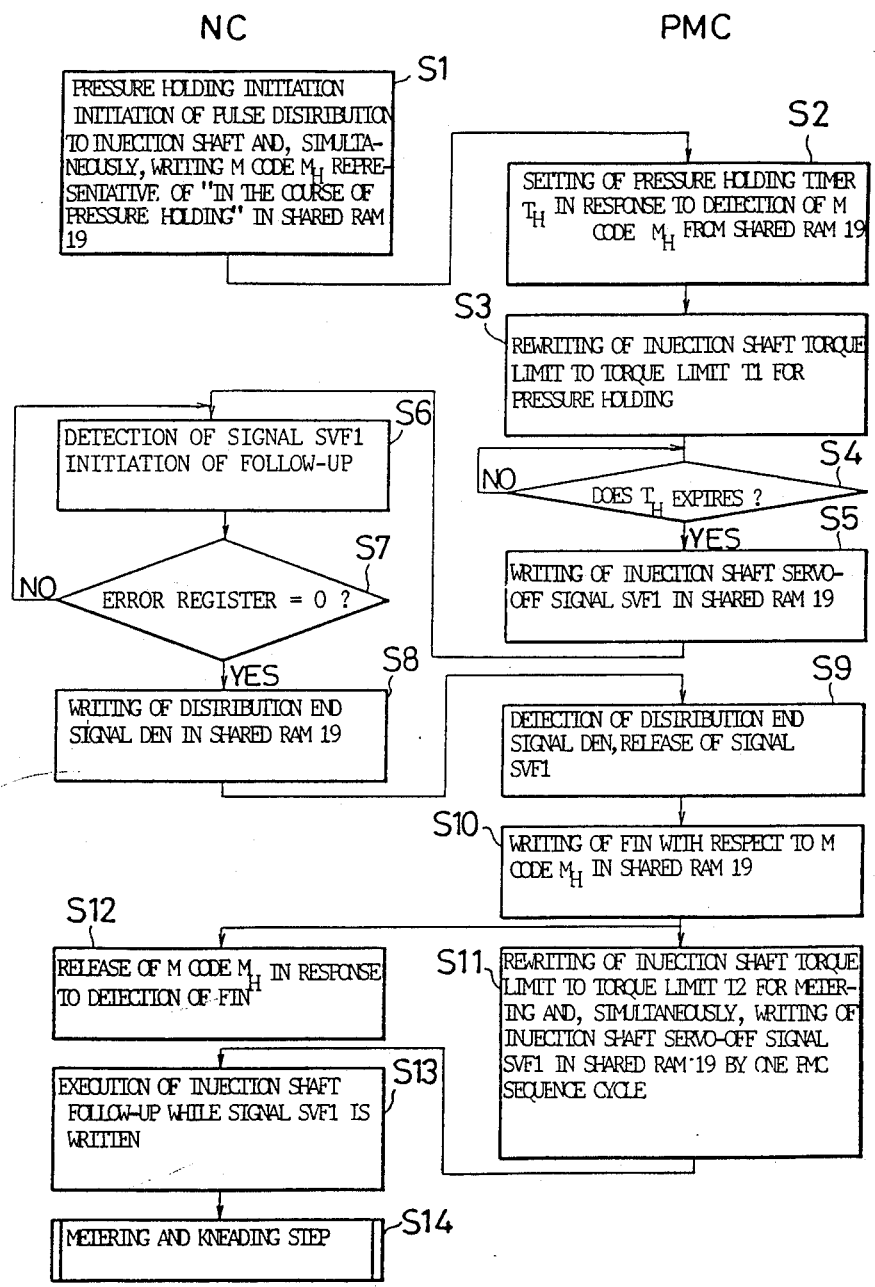

METHOD OF CONTROLLING SWITCHING FROM PRESSURE HOLDING TO METERING AND KNEADING

BACKGROUND OF THE INVENTION

The present invention relates to a switching control method which can smoothly effect transfer from a pressure holding step to a metering and kneading step in an injection-molding machine employing a servomotor as an injection shaft driving source.

An injection-molding machine comprises an injection shaft driving source for axially driving a screw, and operates in such a manner that the screw is driven for forward movement to inject molten resin into a mold. After the molten resin is injected into the mold, a hold pressure, which lower than the injection pressure and which acts in the same direction is as the injection pressure applied to the screw. Typically in an injection-molding machine which employs a servomotor as an injection shaft driving source and which comprises a numerical control unit including a servo circuit for driving the servomotor, a move command sufficient that the tip of the screw reaches a tip of a heating cylinder is sent to the servo circuit to generate the hold pressure. That is, the screw is driven for forward movement by axial driving force in accordance with the move command and, subsequently, the screw is retained at an axial position short of the cylinder tip position by a cushion amount, where the axial driving force balances with the pressure of the molten resin in the mold. This is the hold pressure that is applied to the resin. During a subsequent metering and kneading step, axial pressure, i.e., back pressure lower than the hold pressure and acting in the backward direction is applied to the screw while rotating the latter, to effect metering and kneading.

At transfer from the pressure holding step to the metering and kneading step, the molten resin slightly expands in volume due to a differential pressure between the hold pressure. The back pressure, and the screw moves rearwardly in response to this differential pressure. At this time, an error amount equal to an added value of the cushion amount and the amount of rearward movement of the screw is accumulated in an error register of the servo circuit. As the error amount exceeds the register capacity, the error register overflows and, in response thereto, the typical numerical control unit generates an alarm and operates so as to interrupt operation of the injection-molding machine. It is inconvenient that the injection-molding machine stops in operation during execution of the usual injection molding cycle. Additionally, as is publicly known, even if transfer is made to the metering and kneading step after follow-up of the error register at completion of the pressure holding step so as to bring the error amount accumulated in the error register and equivalent to the cushion amount, to "0", similar inconvenience is caused if the amount of rearward movement of the screw is large.

SUMMARY OF THE INVENTION

It is, therefore, an object of the invention to prevent overflow of an error register within a servo circuit at transfer from a pressure holding step to a metering and kneading step, to thereby prevent interruption of operation of an injection-molding machine.

In order to achieve the above-mentioned object, a method of controlling switching from pressure holding to metering and kneading, according to the invention, in an injection-molding machine which employs a servomotor as an injection shaft driving source for axially driving a screw and which drives the servomotor through a servo circuit having an error register to apply back pressure during injection, during pressure holding and during metering and kneading, comprises the steps of reducing an error amount accumulated in the error register to such a predetermined value that the register does not overflow at completion of a pressure holding step, switching a value of torque limit acting on the servomotor from a set value for the pressure holding to a set value for the metering and kneading, reducing the error amount of the error register to a value equal to or lower than the predetermined value over a predetermined period of time from execution of the switching, and then transferring to a metering and kneading step.

In this manner, the invention is arranged such that the error amount accumulated in the error register is reduced at completion of the pressure holding while output torque of the injection shaft servomotor is retained to a value at the pressure holding, the value of the torque limit acting on the servomotor is then altered from the value for the pressure holding to the value for the metering, and the error amount of the error register is reduced. With such a arrangement, even if the screw moves rearwardly under reaction force from the resin when reduction in the output torque of the injection shaft servomotor occurs in response to the alteration of the torque limit value so that the error amount is generated within the error register, the error amount is not accumulated within the error register, so that overflow of the error register, in turn, interruption of operation of the injection-molding machine does not occur.

BRIEF DESCRIPTION OF THE DRAWINGS

FIG. 3 is a flow chart of a control program for switching from pressure holding to metering and kneading, which is executed by a numerical control unit illustrated in FIG. 1.

DESCRIPTION OF THE PREFERRED EMBODIMENT

Figure 1:
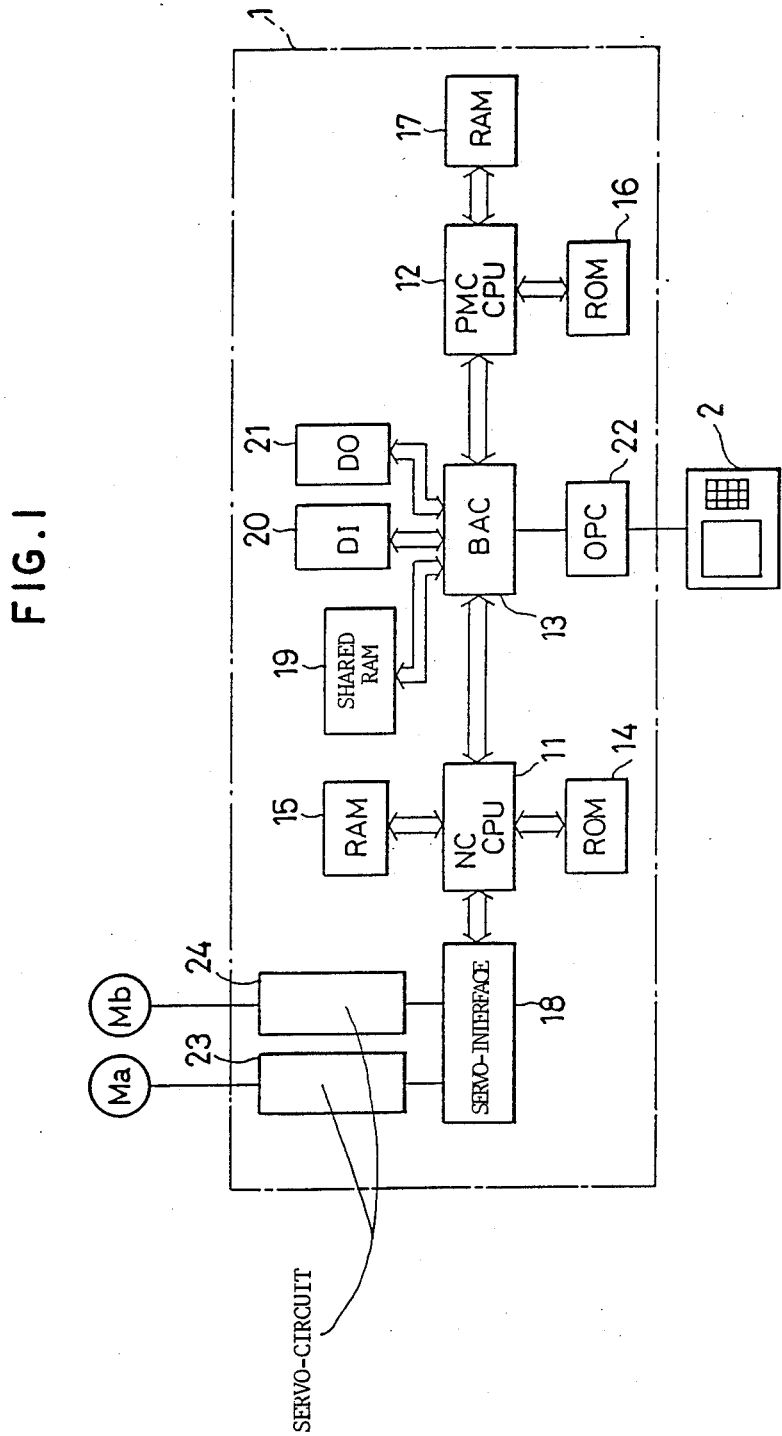
FIG. 1 is a block diagram showing an essential portion of an injection-molding machine to which a switching control method according to an embodiment of the invention is applied.

FIG. 1 shows a control section of an injection-molding machine for executing a method of controlling switching from pressure holding to metering and kneading according to an embodiment of the invention. In the figure, 1 is a numerical control unit for controlling the injection-molding machine. The numerical control unit 1 comprises a numerical control microprocessor (hereinafter referred to as NC CPU) 11, and a microprocessor (hereinafter referred to as PMC CPU) 12 for controlling a programmable machine controller, not shown. Connected to the NC CPU 11 are a ROM 14 having stored therein a monitor program for generally controlling the injection-molding machine, and a RAM 15 for temporal storage of data. Also connected to the NC CPU 11 through a servo-interface 18 are servo circuits for driving and controlling respective servomotors for a clamp shaft, an ejector shaft, an injection shaft and a screw rotating shaft. FIG. 1 shows only servomotors Ma, Mb respectively for the injection shaft and the screw rotating shaft, and servo circuits 23, 24 associated respectively with both the motors.

Connected to the PMC CPU 12 are a ROM 16 having stored therein a sequence program for use in execution of various kinds of operations of the injection-molding machine subsequently to be described, and a RAM 17 for temporal storage of data. Reference numeral 19 identifies a nonvolatile shared RAM having a back-up power source. The RAM 19 is adapted to store an NC program for use in control of various kinds of operations of the injection-molding machine, various kinds of set values, parameters and the like. Reference numeral 13 identifies a bus-arbiter controller (hereinafter referred to as BAC). Connected to the BAC 13 through respective buses are the NC CPU 11, the PMC CPU 12, the shared RAM 19, an input circuit 20, and an output circuit 21. The BAC 13 is adapted to selectively permit the use of the buses by both the CPUs 11, 12. A data input unit with display (hereinafter referred to as CRT/MDI) 2 is serially connected to the BAC 13 through an operator panel controller 22.

Figure 2:
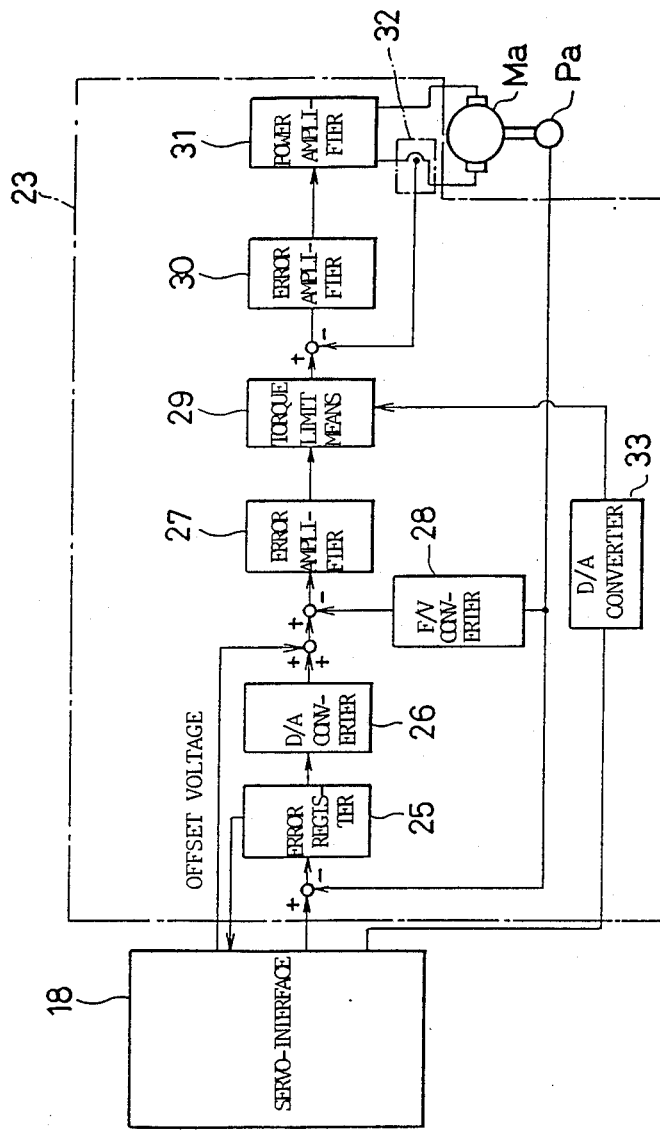
FIG. 2 is a block diagram showing in detail an injection shaft servo circuit illustrated in FIG. 1.

The servo circuit 23 and its peripheral elements will next be described further with reference to FIG. 2. In FIG. 2, the reference character Pa denotes a pulse encoder which is coupled to the injection shaft servomotor Ma and which outputs pulses with rotation of the motor, i.e., axial movement of a screw, not shown.

The servo circuit 23 comprises an error register 25 which is operative in response to a command pulse for axially moving the screw, supplied from the NC CPU 11 through the servo-interface 18, and a pulse output from the pulse encoder Pa, to store a current deviation between a command screw position and an actual screw position. A D/A converter 26 for converting the stored value of the error register 25 into an analog speed command voltage is arranged at the subsequent stage of the error register 25 such that an added voltage of the speed command voltage and an offset voltage (to be described later) from the servo-interface 18 is applied to a noninverting input terminal of an error amplifier 27. An inverting input terminal of the amplifier 27 is connected to an F/V converter 28 for converting the frequency of the pulse train outputted from the pulse encoder Pa into a voltage representative of an actual screw moving speed, such that the amplifier 27 outputs a deviation between the above-mentioned added voltage and the actual speed voltage as an armature current command associated with the servomotor Ma. Torque limit means 29 for retaining back pressure applied to the screw to a set value is arranged at the subsequent stage of the error amplifier 27. The torque limit means 29 is adapted to be operative in response to a command from the PMC CPU 12 converted into an analog amount by a D/A converter 33, to limit the output of the amplifier 27 to a value equal to or lower than the level in accordance with the set back pressure. The numeral 30 denotes an error amplifier for amplifying a deviation between a driving current command supplied from the error amplifier 27 through the torque limit means 29 and an actual driving current detected by a current detector 32. The error amplifier 30 has its output side connected to a power amplifier 31.

The servo circuit 24 is arranged similarly to the servo circuit 23 except that the servo circuit 24 does not include an element corresponding to the torque limit means 29.

The operation of the apparatus according to the embodiment will next be described with reference to FIG. 3.

First set by the CRT/MDI 2 are various kinds of set values such as a torque limit value for pressure holding, a pressure holding period of time, a torque limit value for metering and kneading, an axial position of the screw at completion of the metering and kneading, and the like. These set values are then stored respectively in predetermined address regions of the shared RAM 19. Subsequently, a series of injection molding operations consisting of various steps is executed in accordance with the NC program stored in the shared RAM 19.

In the pressure holding step, the NC CPU 11 initiates pulse distribution to the servo circuit 23 associated with the injection shaft servomotor Ma through the servo-interface 18. Specifically, the CPU 11 supplies the number of move command pulses required for moving the screw tip to the tip of the heating cylinder, to the error register 25 of the servo circuit 23. At this initiation of the pulse distribution, the CPU 11 writes an M code $M_H$ representative of "in the course of pressure holding", in the shared RAM 19 through the BAC 13 (step S1). As the PMC CPU 12 detects that the M code $M_H$ has been written in the shared RAM 19 through the BAC 13, the PMC CPU 12 sets a pressure holding timer $T_H$ (step S2), and rewrites the torque limit value on the injection shaft stored in the RAM 19 to a higher torque limit value T1 for the pressure holding (step S3). The rewritten torque limit value is applied to the torque limit means 29 through the BAC 13, the NC CPU 11, the servo-interface 18 and the D/A converter 33 of the servo circuit 23.

Since, as described above, the move command sufficient that the screw tip reaches the heating cylinder tip is sent to the error register 25, the screw is driven for forward movement against the pressure of the resin filled in the mold at the injection step, by a higher output torque of the servomotor Ma in compliance with the above-mentioned torque limit value. Subsequently, as the screw reaches the axial position just short of the cylinder tip by the cushion amount, the driving force and the resin pressure balance with each other, so that the screw is retained at this position. As a result, the set hold pressure is applied to the resin.

Subsequently, as the pressure holding period of time expires, that is, as the period of time set by the pressure holding timer $T_H$ expires (step S4), the PMC CPU 12 writes a servo-off signal SVF1 on the injection shaft, in the shared RAM 19 (step S5) as the NC CPU 11 detects the servo-off signal SVF1, the NC CPU 11 initiates follow-up of the error register 25, with injection shaft servomotor Ma excited. That is, the CPU 11 reads an error amount on the order equivalent to the cushion amount, stored in the error register 25, and effects such pulse distribution as to bring the error amount to "0". Subsequently, as the error amount in the error register 25 is brought to "0" (step S7, the CPU 11 writes a distribution end signal DEN in the shared RAM 19 (step S8). As the PMC CPU 12 detects the distribution end signal DEN from the shared RAM 19 through the BAC 13, the PMC CPU 12 erases the servo-off signal SVF1 written at the step S5 (step S9). The PMC CPU 12 then writes, in the shared RAM 19, a FIN signal that is representative of completion of the treatment associated with the M code $M_H$ indicative of "in the course of pressure holding" (step S10). Subsequently, the PMC CPU 12 rewrites the torque limit value for the injection shaft during the PMC sequence cycle for which writing of the FIN signal is effected, to a value T2 for the metering. The PMC CPU 12 again writes the servo-off signal SVF1 in the shared RAM, and erases the servo-off signal SVF1 during the next PMC sequence cycle. That is, the servo-off signal is written over a period of time required to follow up the error amount generated with rearward movement of the screw, here, over one PMC sequence cycle (step S11).

On the other hand, as the NC CPU 11 detects, through the BAC 13, that the FIN signal is written in the shared RAM 19, the NC CPU 11 releases the M code $M_H$ (step S12), and follows up the error register 25 in a manner like that described above while the servo-off signal SVF1 is written (step S13). As a result, the screw moves rearwardly with reduction in the output torque of the servomotor Ma in response to the rewriting between the torque limits at the step S11, and, with reduction in pressure acting upon the resin, so that the error amount is generated in the error register 25. Nevertheless, pulse distribution is effected to the error register 25 so as to cancel the error amount. Therefore, no error amount is accumulated in the register 25 and, accordingly, the register does not overflow.

Subsequently, the program proceeds to the metering and kneading step (step S14) where the NC CPU 11 drives the screw rotating shaft servomotor Mb at a set rotational speed, through the servo-interface 18 and the servo circuit 24, and drives the injection shaft servomotor Ma through the servo-interface 18 and the servo circuit 23 in the following manner.

When the set back pressure is higher than friction force which is generated in a power transmission system, not shown, connecting the screw and the servomotor Ma to each other and which acts in the back pressure increasing direction, the NC CPU 11 does not apply the offset voltage to the error amplifier 27, but sends the torque limit command corresponding to a difference between the set back pressure and the friction force, to the torque limit means 29. Further, the CPU 11 outputs the move command to the error register 25 so as to retain the screw at the current position. Thereafter, as the molten resin increases in amount and the screw moves rearwardly under the resin pressure, a negative pulse is supplied from the pulse encoder Pa to the error register 25 so that the register value, i.e., the error amount representative of a difference between the command screw position and the actual screw position increases. The torque command is outputted from the error amplifier 27, for returning the screw to its initial position in response to the increase in the register value. The torque command is limited to a value equal to or lower than the torque limit value by the torque limit means 29 to which the torque limit value is applied from the CPU 11. As a result, the screw, subjected to a resultant force (back pressure) of the friction force and the output from the servomotor Ma corresponding to the difference between the set back pressure and the friction force, applies the set back pressure to the resin.

During metering, the NC CPU 11 reads the value of the error register 25 at a predetermined cycle, and performs pulse distribution so as to bring the register value to zero. That is, the NC CPU 11 follows up the register. However, in order to follow up the register, it is necessary to do requisite calculation on the bases of the detected register value, and then to effect pulse distribution in compliance with the calculation result. Accordingly, it takes time until the follow-up is completed. On the other hand, in the meantime, the resin pressure increases and the screw moves rearwardly. Therefore, in practice, the error register value is not brought to zero. After all, the torque command is always issued during metering, for driving the screw for forward movement. In this manner, as the screw moves rearwardly to the metering completion position while applying the set back pressure to the resin, the NC CPU 11, which detects the screw current position with reference to an injection shaft current value register, not shown, during execution of the follow-up process, detects arrival at the metering completion position, to interrupt rotation of the screw. As a result, the metering and kneading operation is completed.

On the other hand, when the set back pressure is lower than the friction force, NC CPU 11 outputs, to the error amplifier 27, an offset voltage (minus) acting to move the screw rearwardly, and outputs, to the torque limit means 29, a torque limit value corresponding to the difference between the friction force and the set back pressure. As a result, the torque command driving the servomotor Ma in the direction of rearward movement of the screw is applied from the error amplifier 27 to the torque limit means 29. By the means 29, the torque command is limited to a value corresponding to the difference between the friction force and the set back pressure. As the screw moves rearwardly during metering and kneading, the friction force generated in the power transmitting system acts to prevent rearward movement of the screw, while the output from the servomotor Ma acts to promote rearward movement of the screw. After all, the set back pressure is applied to the resin. Thereafter, metering and kneading are effected in a manner like that described above.

We claim:
1. A method of controlling switching of an injection molding machine from pressure holding to metering and kneading in the injection molding machine employing a servomotor as an injection shaft driving source for axially driving a screw and driving said the servomotor through a servo circuit having an error register to apply a back pressure during injection, during pressure holding and during metering and kneading, comprising the steps of:
   (a) reducing an error amount accumulated within the error register at completion of a pressure holding step, to a predetermined value so that the error register does not overflow.
   (b) switching a torque limit for the servomotor, from a set value for the pressure holding to a set value for the metering and kneading;
   (c) reducing an error amount within the error register caused by step (b) to a value equal to or lower than said predetermined value over a predetermined period of time from the time of execution of said switching; and then
   (d) transferring to a metering and kneading step.
2. A method of controlling switching of an injecting molding machine from pressure holding to metering and kneading as set forth in claim 1, wherein steps (a) and (c), include providing pulses to the error register via pulse distribution so as to bring an error amount accumulated within the error register to zero.

* * * * *